United States Patent [19]
Whitmire

[11] Patent Number: 6,115,817
[45] Date of Patent: Sep. 5, 2000

[54] METHODS AND SYSTEMS FOR FACILITATING TRANSMISSION OF SECURE MESSAGES ACROSS INSECURE NETWORKS

[76] Inventor: David R. Whitmire, P.O. Box 393, Watkinsville, Ga. 30677-0393

[21] Appl. No.: 09/072,986

[22] Filed: May 6, 1998

[51] Int. Cl.[7] .................................................... H04L 9/00
[52] U.S. Cl. .................... 713/171; 713/155; 713/156; 713/158; 380/28; 380/30
[58] Field of Search .................... 380/277, 278, 380/281, 28, 30; 713/155, 156, 168, 170, 171

[56] References Cited

PUBLICATIONS

"Applied Cryptography", Schneier, pp. 53, 54, 180, 181, 225.
Pretty Good Privacy™, PGP®Business Security, Version 5.5 Windows User's Guide, 1997, pp. 1–6 and 23–46.
Schneier, Bruce, Applied Cryptography: Protocols, Algorithms, and Source Code in C (2nd Ed. 1996), 1996, pp. 31–34.

*Primary Examiner*—Thomas R. Peeso
*Attorney, Agent, or Firm*—Finnegan, Henderson, Farabow, Garrett & Dunner L.L.P.

[57] ABSTRACT

In accordance with the present invention, methods and systems consistent with the present invention facilitate the transmission of secure messages across an insecure network. The sender requests a recipient's security software object by, for example, clicking on a button or icon on the recipient's web page. A security software object with encapsulated security information and routing information is transmitted to the sender. The sender composes a message using the security software object. When sender indicates completion, the security software object secures the message according to the security procedure of the object and transmits the secured message to the recipient.

27 Claims, 4 Drawing Sheets

METHODS AND SYSTEMS FOR FACILITATING TRANSMISSION OF SECURE MESSAGES ACROSS INSECURE NETWORKS

BACKGROUND OF THE INVENTION

The present invention relates generally to methods and systems for facilitating the transmission of secure messages over an insecure network and, in particular, is directed to methods and systems for encapsulating security procedures, a recipient's security procedure information, and electronic mail address information in a software object.

The Internet has quickly become a popular tool for communicating and conducting business. The Internet is a very large network of smaller interconnected local area networks (LANs) and wide area networks (WANs). By 1995, Internet access was available in 180 countries and there were more than 30 million users. Many expect that the number of worldwide users of the Internet will exceed 100 million by the year 2000.

People communicate with one another over the Internet using electronic mail, that is, e-mail. Using e-mail, a user on the Internet can transfer messages entered from the keyboard or attach and send large electronic files to another user on the Internet almost instantaneously. As used herein, the term "message" includes not only text messages but also files, documents, and any other data to be transmitted from a sender to a recipient, and any combination thereof unless the context indicates otherwise. The Internet is also used to conduct a broad range of commercial and financial transactions. Parties use the communication capabilities of the Internet to enter into contracts electronically and use electronic funds transfers (EFTs) to satisfy the resulting financial obligations. An EFT involves the movement of funds from one bank account to another in response to electronically-communicated payment instructions.

Although the Internet offers a fast, reliable, and efficient way to communicate and conduct business, information transmitted can be vulnerable to security breaches. Without adequate security controls, privileged and confidential communications, financial information, and other communications involving private data that are sent via e-mail could possibly enter the public domain with disastrous results. Professionals and their clients may be exposed to significant risks including financial liabilities or the career-ending loss of professional status.

Technologies currently exist that allow a user to protect private information transmitted over the Internet. Public-key cryptography, for example, is a process that allows users to secure communications with the use of a public-private key pair. Using public-key cryptography, a sender of confidential information uses a public-key algorithm and a public key specified by the intended recipient to encrypt the data. The encrypted data can then be transmitted via any public means, including the Internet, without loss of privacy. The intended recipient uses a private key known only to the recipient and a public-key algorithm to decrypt the data. For more details on public-key cryptography, see Bruce Schneier, Applied Cryptography (1996), pp. 31–34.

Many software providers have developed software products designed to make digital security and public-key cryptography more convenient for the user. One such software package is the Pretty Good Privacy ("PGP") software package offered by Pretty Good Privacy, Inc. Even using software like PGP, however, the process of sending an encrypted document may still be too difficult or time-consuming for many users. First, before sending an encrypted e-mail to a recipient, for example, the sender must first obtain the recipient's public key. Even if the key is posted on a public or corporate key server, the sender will have to spend some amount of time to find and access it. Second, the sender must import the recipient's key into his or her operating version of the encryption software by, for example, cutting and pasting the key text from the key server's page or typing in the key information directly. Both methods are prone to errors and, as a result, the encryption feature will not function properly. Lastly, even if the sender implements the encryption software correctly, the intended recipient may not be operating a compatible software package.

The present invention provides methods and systems for facilitating the transmission of a secure message across an insecure network by encapsulating a security procedure that is compatible with the recipient in a security software object that is transmitted to the sender. The present invention further provides methods and systems for facilitating transmission of a secure message across an insecure network by encapsulating security information used by the security procedure, such as the recipient's public key, in the security software object.

The present invention further provides methods and systems for transmission of a secure message across an insecure network by encapsulating the recipient's communications procedure and routing information to facilitate transmitting the encrypted data to an intended recipient.

SUMMARY OF THE INVENTION

Methods for facilitating transmission of a secure message across an insecure network consistent with this invention comprise the steps, performed by a processor, of receiving a request for a recipient's security software object from a sender; transmitting the software object in response to the user request, the software object comprising a security procedure and recipient information; receiving a secured message secured using the security procedure and the recipient information; and transmitting the secured message to the recipient based on the recipient information.

In accordance with another aspect of the present invention, a method for facilitating the transmission of a secure message from a sender to a recipient comprises the steps, performed by a processor, of receiving a request from a sender for recipient information encapsulated in a self-executable security procedure; transmitting the recipient information encapsulated in a self-executable security procedure in response to the request; receiving a secured message secured using the self-executable security procedure and the recipient information; and transmitting the secured message to the recipient based on the recipient information.

In accordance with still another aspect of the present invention, a method for creating and transmitting a secured message over an insecure network, comprises the steps, performed by a processor, of obtaining a software object comprising a security procedure and recipient information; generating a message; executing the software object to secure the message; and transmitting the secured message based on the recipient information.

A still further aspect of the present invention is a computer program product that comprises a computer-usable medium having computable-readable code embodied therein for transmitting a secure message across an insecure network between a client and a server, the computer program product comprising the steps, performed by a processor, of receiving a request from a sender; transmitting a software object in response to the user request, the software object comprising a security procedure and recipient information; receiving a secured message secured using the security procedure and the recipient information; and, transmitting the secured message to the recipient based on the recipient information.

Yet another aspect of the present invention is a system for facilitating the transmission of a secure message from a sender to a recipient comprising a first receiver for receiving a request from a sender; a first transmitter for transmitting a software object in response to the user request, the software object comprising a security procedure and recipient information; a second receiver for receiving a secured message secured using the security procedure and the recipient information; and a second transmitter for transmitting the secured message to the recipient based on the recipient information.

BRIEF DESCRIPTION OF THE DRAWINGS

The accompanying drawings, which are incorporated in and constitute a part of this specification, illustrate the invention and, together with the description, serve to explain the principles of the invention.

DETAILED DESCRIPTION OF THE INVENTION

A. Overview

Systems and methods consistent with the present invention allow secure messages to be transmitted across a network connection. A sender obtains a security software object comprising a security procedure and other information, such as the recipient's public key and e-mail address. The sender then composes a message or attaches a file using the security software object. Upon indication from the sender, the software object secures the message and attached file by executing the security procedure using information encapsulated in the security software object. The secured message is then transmitted across the network connection to the recipient.

The present invention may be implemented using hardware, software, or a combination of hardware and software. Specifically, the invention may be implemented with both object-oriented programming languages, like Java® and C++, and nonobject-oriented programming languages. (Java® is a registered trademark of Sun Microsystems, Inc. in the United States and other countries.)

Reference will now be made in detail to an exemplary implementation of a system consistent with the present invention which is also illustrated in the accompanying drawings. While the description includes exemplary embodiments, other embodiments are possible, and changes may be made to the implementation described without departing from the spirit and scope of the invention. Wherever possible, the same reference numbers will be used throughout the drawings to refer to the same or like parts.

B. Computer Architecture

Figure 1:
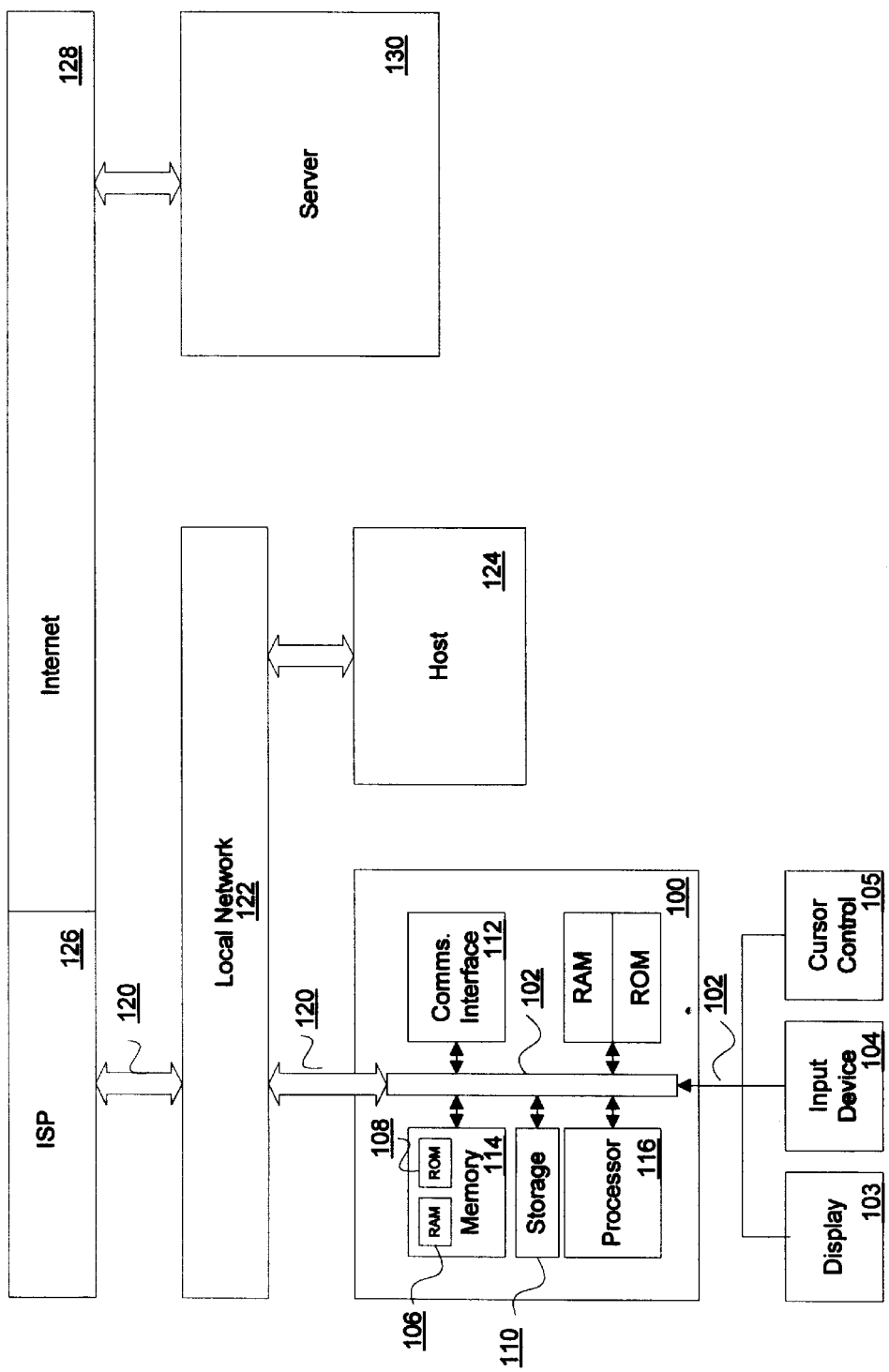
FIG. 1 is a schematic block diagram illustrating a computer architecture suitable for use with the present invention.

Methods and systems consistent with the present invention may be implemented using distributed systems such as exemplary distributed system 10 shown in FIG. 1. Client 100 is a conventional computer that includes a bus 102 or other communication mechanism for communicating information and a processor 116 coupled with bus 102 for processing information and executing application programs. Client 100 also includes a main memory 114 comprising, for example, a random access memory (RAM) 106 or other dynamic storage device and a read only memory (ROM) 108 or other static storage device, coupled to bus 102 for storing information and instructions to be executed by processor 116. A storage device 110, such as a magnetic disk or optical disk, is provided and coupled to bus 102 for storing information and instructions.

Client 100 may be coupled via bus 102 to a display 103, such as a cathode ray tube (CRT), for displaying information to a computer user. An input device 104, including alphanumeric and other keys, is coupled to bus 102 for communicating information and command selections to processor 116. Another type of user input device is cursor control 106, such as a mouse, a trackball, or cursor direction keys for communicating direction information and command selections to processor 116 and for controlling cursor movement on display 103. This input device typically has two degrees of freedom in two axes, a first axis (e.g., x) and a second axis (e.g., y), that allows the device to specify positions in a plane.

Methods and systems consistent with the present invention utilize client 100 for transmitting a secure message across an insecure connection. Consistent with one implementation, processor 116 of client 100 executes one or more sequences of one or more instructions contained in main memory 114. Such instructions may be read into main memory 114 from another computer-readable medium, such as storage device 110, or received in the form of an object from server 130. Execution of the sequences of instructions contained in main memory 114 causes processor 116 to perform the process steps described herein. In an alternative implementation, hard-wired circuitry may be used in place of or in combination with software instructions to implement the invention. Thus, implementations of the invention are not limited to any specific combination of hardware circuitry and software.

The term "computer-readable medium" as used herein refers to any media that participates in providing instructions to processor 116 for execution. Such a medium may take many forms, including but not limited to, non-volatile media, volatile media, and transmission media. Non-volatile media includes, for example, optical or magnetic disks, such as storage device 110. Volatile media includes dynamic memory, such as main memory 114. Transmission media includes coaxial cables, copper wire, and fiber optics, including the wires that comprise bus 102. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, papertape, any other physical medium with patterns of holes, a RAM, PROM, and EPROM, a FLASH-EPROM, any other memory chip or cartridge, a carrier wave, or any other medium from which a computer can read.

Various forms of computer readable media may be involved in carrying one or more sequences of one or more instructions to processor 116 for execution. For example, the instructions may initially be carried on a magnetic disk of a remote computer. The remote computer can load the instructions into its dynamic memory and send the instructions over a telephone line using a modem. A modem local to client 100 can receive the data on the telephone line and use an infrared transmitter to convert the data to an infrared signal. An infrared detector coupled to bus 102 can receive the data carried in the infrared signal and place the data on bus 102. Bus 102 carries the data to main memory 114, from which processor 116 retrieves and executes the instructions. The instructions received by main memory 114 may optionally be stored on storage device 110 either before or after execution by processor 116.

Client 100 also includes a communication interface 118 coupled to bus 102. Communication interface 112 provides a two-way data communication coupling to a network link 120 that is connected to local network 122. For example, communication interface 112 may be an integrated services digital network (ISDN) card or a modem to provide a data communication connection to a corresponding type of telephone line. As another example, communication interface 112 may be a local area network (LAN) card providing a data communication connection to a compatible LAN. Wireless links may also be implemented. In any such implementation, communication interface 112 sends and receives electrical, electromagnetic, or optical signals that carry digital data streams representing various types of information.

Network link 120 typically provides data communication through one or more networks to other data devices. For example, network link 120 may provide a connection through local network 122 to a host computer 124 and/or to data equipment operated by an Internet Service Provider (ISP) 126. ISP 126, in turn, provides data communication services through the Internet 128. Local network 122 and Internet 128 both use electric, electromagnetic, or optical signals that carry digital data streams. The signals through the various networks and the signals on network link 120 and through communication interface 112, which carry the digital data to and from client 100, are exemplary forms of carrier waves transporting the information.

Client 100 can send messages and receive data, including program code, through the network(s), network link 120, and communication interface 112. In the Internet example, a server 130 might transmit a requested code for an application program through Internet 128, ISP 126, local network 122, and communication interface 112. In accordance with one implementation, one such downloaded application comprises a software object with encapsulated security procedure and recipient information, as described herein. The received code may be executed by processor 116 as it is received and/or stored in storage device 110 or other nonvolatile storage for later execution. In this manner, client 100 may obtain application code in the form of a carrier wave.

Although client 100 is shown in FIG. 1 as being connectable to one server 130, those skilled in the art will recognize that client 100 may establish connections to multiple servers on Internet 128.

C. One Embodiment of the Method

Figure 2:
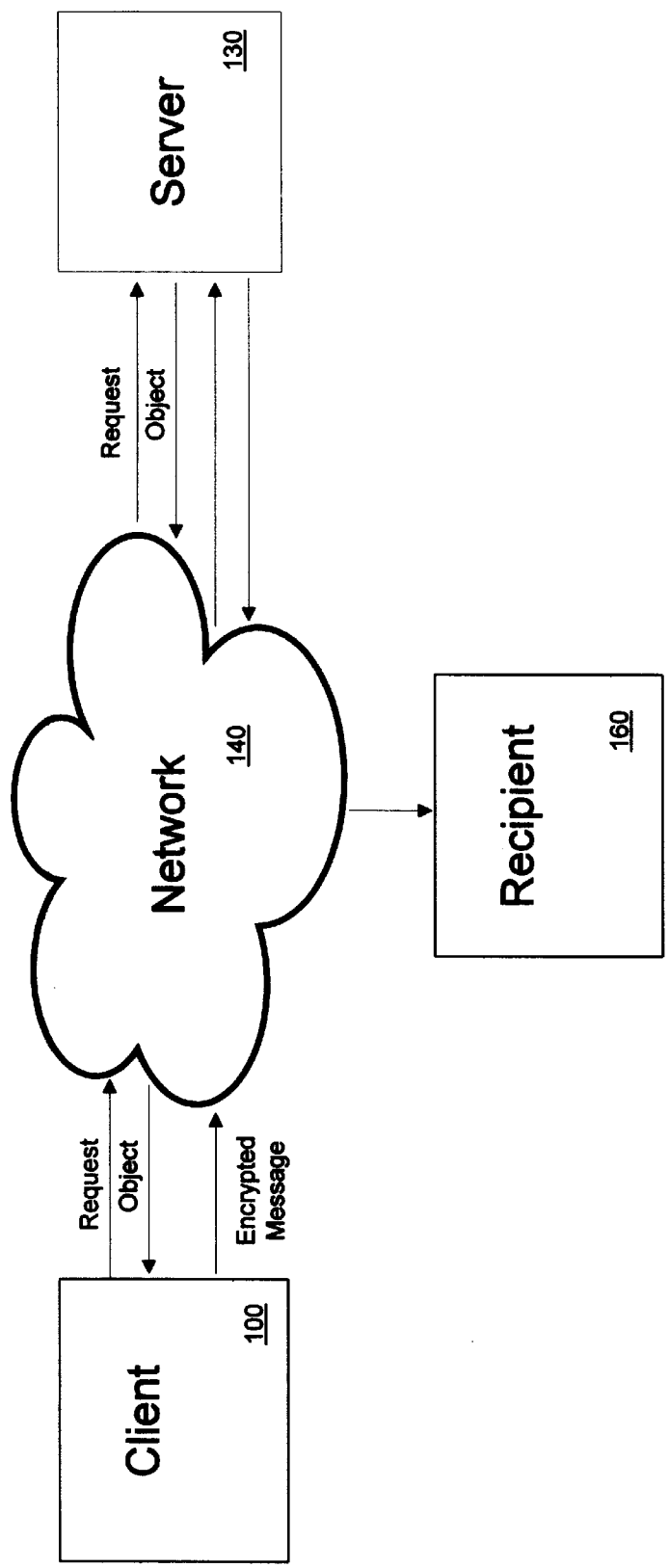
FIG. 2 is a pictorial representation of a method consistent with the present invention.

Methods consistent with the present invention will be described in terms of the operation of a server with references to the diagram in FIG. 2. For example, in one embodiment of the present invention, server 130 receives a request for the security software object from client 100, the computer of the entity wishing to transmit a secured message. The request may be in the form of, for example, "clicking" a web site button or icon, an e-mail, or a verbal request for the software. The server transmits the security software object to the client over network 140. Network 140 may be a plurality of local networks, network links, and communication interfaces including, but not limited to, Internet 128, ISP 126, local network 122, and communications interface 112 as depicted in FIG. 1. Client 100 receives the security software object. After execution of the security software object, an encrypted message is transmitted from client 100 to recipient 160 via network 140. The encrypted message may also be received by server 130 and retransmitted to recipient 160 via network 140.

Figure 3:
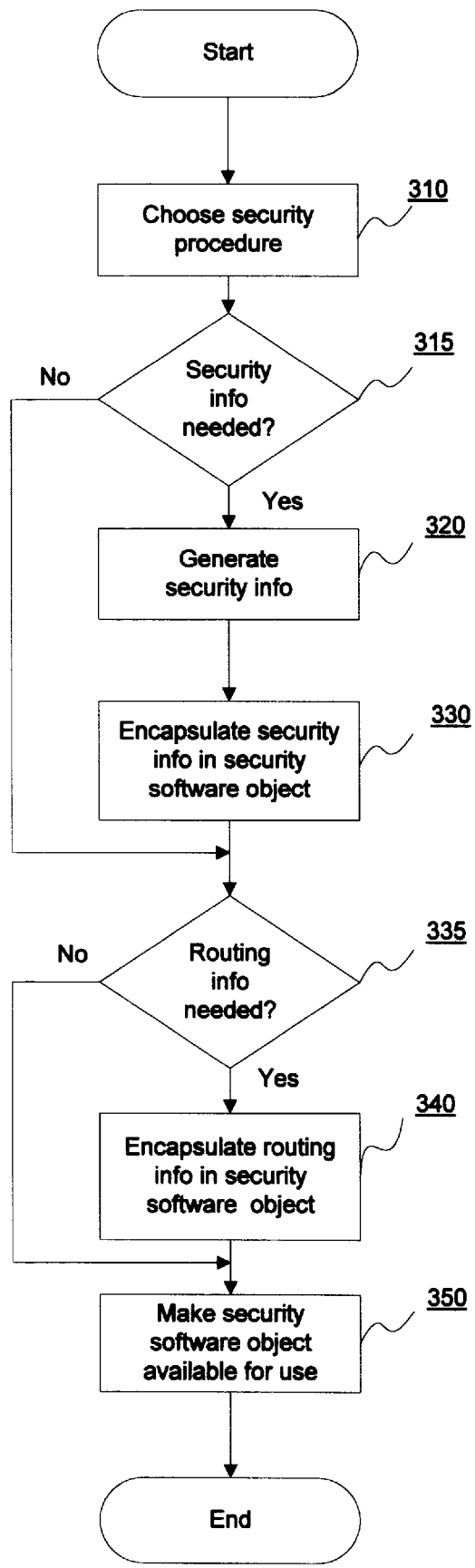
FIG. 3 is a flowchart of the steps performed by a processor consistent with the present invention for generating a security software object.

FIG. 3 is a flowchart of the steps performed by a processor consistent with the present invention for generating a security software object. Methods consistent with the present invention implement object-oriented programming techniques, such as the C++ or Java® programming languages. Object-oriented programming is a form of software development that involves the creation and use of "objects". Objects are software entities that contain data as well as instructions that manipulate the data.

One of the principle benefits of object-oriented programming is encapsulation. In object-oriented programming, "encapsulation" refers to the process of grouping data and the code that manipulates it into a single entity or object.

To prepare the object, a security procedure is chosen (step 310). The security procedure can be, for example, public-key encryption or any other procedure suitable for securing electronic data. If other information related to the execution of the security procedure is needed (step 315), that information is generated (step 320). A security procedure based on public-key encryption for example, will require that the sender use the recipient's public key to encrypt the message. In methods consistent with the present invention, the public key is obtained or generated and is encapsulated in the security software object along with the security algorithm (step 330).

The recipient may also want to facilitate receipt of the encrypted message by providing routing information. If such routing information is needed (step 335), routing information is encapsulated in the security software object (step 340). Routing information may be, for example, the recipient's e-mail address, Internet protocol address, or other network identification information. Routing information may also include a communications procedure used by the recipient. The security software object may then be made available for public use by, for example, posting on the World Wide Web, creating disks for distribution, saving as a file for attachment to an e-mail, or by some other means.

Figure 4:
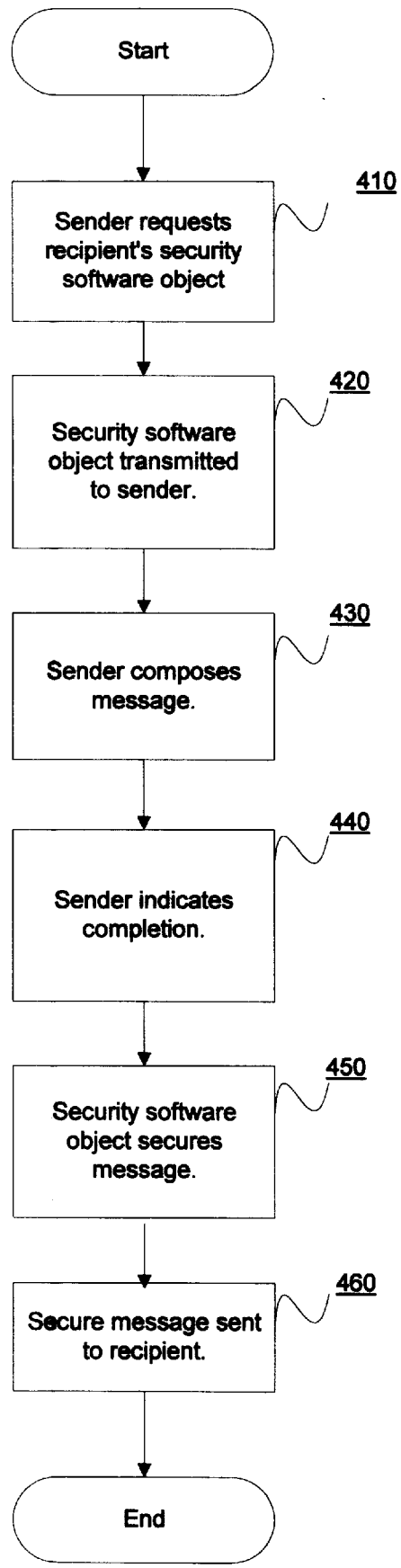
FIG. 4 is a flowchart of the steps performed by a processor consistent with the present invention for facilitating the transmission of a secure message across an insecure network.

FIG. 4 is a flowchart of the steps performed by a processor consistent with the present invention for facilitating the transmission of a secure message across an insecure network. If a sender wants to communicate with the recipient, the sender requests the security software object (step 410). The sender can make such a request by, for example, accessing the recipient's web site and requesting downloading of the object by "clicking" on a button or icon, using his or her computer (client 100). The security software object is transferred to the client computer, for example, by transmitting the file across the Internet or by loading the file from disk (step 420). If loaded from disk, the security software object may contain a function that automatically connects the client to the Internet or, alternatively, the sender may need to activate the object. If the object is downloaded from the Internet, the object may automatically prompt the sender to enter a message or attach a file for transfer. The sender composes a message (step 430). When the sender indicates completion by, for example, clicking on a button or icon (step 440), the security software object encrypts the message using the encapsulated security information in the security software object (step 450). For example, if the security procedure is a public-key algorithm, the security software object will encrypt the message using the recipient's public key that is encapsulated in the security software object. The encrypted message is transmitted across the Internet to the recipient (step 460). If necessary, the security software object may use routing information that is encapsulated in the security software object. Upon receipt of the encrypted message, the recipient can decrypt and use the message.

D. Conclusion

In accordance with the present invention, methods and systems consistent with the present invention facilitate the transmission of secure messages across an insecure network. The sender requests a recipient's security software object by, for example, clicking on a button or icon on the recipient's web page. A security software object with encapsulated security information and routing information is transmitted to the sender. The sender composes a message using the security software object. When sender indicates completion, the security software object secures the message according to the security procedure of the object and transmits the secured message to the recipient.

The foregoing description of an implementation of the invention has been presented for purposes of illustration and description. It is not exhaustive and does not limit the invention to the precise form disclosed. Modifications and variations are possible in light of the above teachings or may be acquired from practicing of the invention. For example, the described implementation includes software but the present invention may be implemented as a combination of hardware and software or hardware alone. The scope of the invention is defined by the claims and their equivalents.

What is claimed:

1. A method for facilitating the transmission of a secure message from a sender to a recipient comprising the steps, performed by a processor, of:

receiving a request for a recipient's security software object from a sender;

transmitting the software object in response to the request, the software object comprising a security procedure and recipient information;

receiving a secured message secured using the security procedure and the recipient information; and transmitting the secured message to the recipient based on the recipient information.

2. A method of claim 1 wherein the security procedure comprises a public-key encryption algorithm.

3. A method of claim 2 wherein the recipient information comprises:

a public key associated with a recipient.

4. A method of claim 1 wherein the recipient information comprises the recipient's routing information.

5. A method for facilitating the transmission of a secure message from a sender to a recipient comprising the steps, performed by a processor, of:

receiving a request from a sender for recipient information encapsulated in a self-executable security procedure;

transmitting the recipient information encapsulated in a self-executable security procedure in response to the request;

receiving a secured message secured using the self-executable security procedure and the recipient information; and transmitting the secured message to the recipient based on the recipient information.

6. A method of claim 5 wherein the security procedure comprises a public-key encryption algorithm.

7. A method of claim 6 wherein the recipient information comprises:

a public key associated with a recipient.

8. A method of claim 5 wherein the recipient information comprises the recipient's routing information.

9. A method for creating and transmitting a secured message over an insecure network, comprising the steps, performed by a processor, of:

obtaining a software object comprising a security procedure and recipient information;

generating a message;

executing the software object to secure the message; and transmitting the secured message based on the recipient information.

10. A method for creating and transmitting a secured message over an insecure network comprising the steps, performed by a processor, of:

transmitting a request for recipient information;

obtaining the recipient information embedded in a self-executable security procedure;

generating a message; and transmitting the message secured by the self-executable security procedure and the recipient information.

11. A method for constructing a software object for transmitting a secure message to an intended recipient over an insecure network comprising the steps of:

determining a security procedure;

determining recipient information;

encapsulating the recipient information and the security procedure in a software object; and storing the software object to a storage medium accessible by users.

12. A computer program product comprising:

a computer-usable medium having computable-readable code embodied therein for transmitting a secure message across an insecure network between a client and a server, the computer program product comprising the steps, performed by a processor, of:

receiving a request from a sender;

transmitting a software object in response to the request, the software object comprising a security procedure and recipient information;

receiving a secured message secured using the security procedure and the recipient information; and, transmitting the secured message to the recipient based on the recipient information.

13. The computer program product of claim 12 wherein the security procedure comprises a public-key encryption algorithm.

14. The computer program product of claim 13 wherein the recipient information comprises:

a public key associated with a recipient.

15. The computer program product of claim 12 wherein the recipient information comprises the recipient's routing information.

16. A computer program product comprising:

a computer-usable medium having computable-readable code embodied therein for transmitting a secure message across an insecure network between a client and a server, the computer program product comprising the steps, performed by a processor, of:

determining a security procedure;

determining recipient information;

encapsulating the recipient information and the security procedure in a software object; and, storing the software object to a storage medium.

17. The computer program product of claim 16 wherein the security procedure comprises a public-key encryption algorithm.

18. The computer program product of claim 17 wherein the recipient information comprises:

a public key associated with a recipient.

19. The computer program product of claim 16 wherein the recipient information comprises the recipient's routing information.

20. A system for facilitating the transmission of a secure message from a sender to a recipient comprising:

a first receiver for receiving a request for a recipient's security software object from a sender;

a first transmitter for transmitting the software object in response to the request, the software object comprising a security procedure and recipient information;

a second receiver for receiving a secured message secured using the security procedure and the recipient information; and, a second transmitter for transmitting the secured message to the recipient based on the recipient information.

21. The system of claim 20 wherein the security procedure comprises a public-key encryption algorithm.

22. The system of claim 21 wherein the recipient information comprises:

a public key associated with a recipient.

23. The system of claim 20 wherein the recipient information comprises the recipient's routing information.

24. An apparatus for facilitating the transmission of a secure message from a sender to a recipient comprising:

a component configured to receive a request from a sender;

a component configured to transmit a software object in response to the request, the software object comprising a security procedure and recipient information;

a component configured to receive a secured message secured using the security procedure and the recipient information; and, a component configured to transmit the secured message to the recipient based on the recipient information.

25. The apparatus of claim 24 wherein the security procedure comprises a public-key encryption algorithm.

26. The apparatus of claim 25 wherein the recipient information comprises:

a public key associated with a recipient.

27. The apparatus of claim 24 wherein the recipient information comprises the recipient's routing information.

* * * * *